(12) United States Patent
Namiki et al.

(10) Patent No.: US 7,993,113 B2
(45) Date of Patent: Aug. 9, 2011

(54) DAMPER AND VACUUM PUMP

(75) Inventors: Hirotaka Namiki, Chiba (JP); Satoshi Okudera, Chiba (JP)

(73) Assignee: BOC Edwards Japan Limited (JP)

( * ) Notice: Subject to any disclaimer, the term of this patent is extended or adjusted under 35 U.S.C. 154(b) by 1116 days.

(21) Appl. No.: 11/665,201

(22) PCT Filed: Oct. 13, 2005

(86) PCT No.: PCT/JP2005/018835
§ 371 (c)(1),
(2), (4) Date: Apr. 12, 2007

(87) PCT Pub. No.: WO2006/041113
PCT Pub. Date: Apr. 20, 2006

(65) Prior Publication Data
US 2008/0085202 A1    Apr. 10, 2008

(30) Foreign Application Priority Data
Oct. 15, 2004    (JP) .................... 2004-302177

(51) Int. Cl.
F04B 17/03    (2006.01)
F03D 11/00    (2006.01)
(52) U.S. Cl. .............. 417/363; 417/423.4; 415/119
(58) Field of Classification Search ............ 417/363, 417/423.4, 454; 415/90, 119
See application file for complete search history.

(56) References Cited

U.S. PATENT DOCUMENTS

| | | | |
|---|---|---|---|
| 4,523,612 A | 6/1985 | Kuklo | 138/30 |
| 4,946,345 A | 8/1990 | Watanabe et al. | 415/90 |
| 6,814,550 B1 * | 11/2004 | Adamietz et al. | 417/363 |
| 7,300,261 B2 * | 11/2007 | Cafri et al. | 417/363 |
| 2003/0007862 A1 * | 1/2003 | Ohtachi et al. | 415/90 |
| 2004/0041478 A1 * | 3/2004 | Ohtachi et al. | 310/90.5 |

FOREIGN PATENT DOCUMENTS

| | | |
|---|---|---|
| DE | 10001509 | 7/2001 |
| EP | 2002295581 | 10/2002 |
| EP | 1580477 | 9/2005 |
| JP | 2002295396 | 10/2002 |

OTHER PUBLICATIONS

Patent Abstracts of Japan, publication No. 2002 295396, publication date Oct. 9, 2002.
Patent Abstracts of Japan, publication No. 56092396, publication date Jul. 27, 1981.
Patent Abstracts of Japan publication No. 56060895, publication date May 26, 1981.
Patent Abstracts of Japan, publication No. 2003 328940, publication date Nov. 19, 2003.

* cited by examiner

*Primary Examiner* — Charles G Freay
(74) *Attorney, Agent, or Firm* — Adams & Wilks (57) ABSTRACT

A damper is configured for a vacuum pump that evacuates a vacuum system via gas transfer by a gas transfer mechanism in the vacuum pump by the rotating action of a rotating body in the vacuum pump. The damper restrains the propagation of vibrations produced in the vacuum pump to the vacuum system during an evacuation operation. The damper comprises a vibration absorbing device that is positionable between the vacuum pump and the vacuum system during an evacuation operation and that has a damping characteristic in a frequency band that coincides substantially with a rotation frequency of the rotating body of the vacuum pump.

10 Claims, 9 Drawing Sheets

(a) MODEL OF CONVENTIONAL DAMPER (b) MODEL OF DAMPER OF THIS EMBODIMENT

DAMPER AND VACUUM PUMP

CROSS-REFERENCE TO RELATED APPLICATIONS

This application is a U.S. national stage application of International Application No. PCT/JP2005/018835, filed Oct. 13, 2005, claiming a priority date of Oct. 15, 2004, and published in a non-English language.

BACKGROUND OF THE INVENTION

1. Field of the Invention

The present invention relates to a damper having a mechanism for restraining the propagation (conduction) of vibrations produced in a vacuum pump.

2. Description of the Related Art

As an apparatus using a vacuum stem such that the interior thereof is kept in a vacuum by accomplishing evacuation using a vacuum pump, semiconductor manufacturing equipment, an electron microscope, a surface analyzer, fine processing equipment, and the like can be cited.

Also, of various types of vacuum pumps, a vacuum pump that is often used to realize a high-vacuum environment is a turbo-molecular pump.

The turbo-molecular pump is configured so that a rotor rotates at a high speed in a casing having a suction port and an exhaust port. On the inner peripheral surface of the casing, stator blades are disposed in a multistage manner. On the other hand, on the rotor, rotor blades are disposed radially in a multistage manner. When the rotor is rotated at a high speed, gas is sucked through the suction port by the action of the rotor blades and the stator blades, and is discharged through the exhaust port.

In the turbo-molecular pump, when the rotor is rotated at a high speed, vibrations are produced by the cogging torque of motor. Also, in the case where the rotor is not balanced completely, vibrations caused by the oscillation of shaft may also be produced.

If such vibrations produced in the vacuum pump propagate to the vacuum system side, the performance of the system may be hindered. For example, the electron microscope and the surface analyzer may be greatly affected even by minute vibrations on the micron order or the nano order.

To solve this problem, a damper is arranged between a vacuum chamber and the vacuum pump to keep vibrations (including minute vibrations) produced in the vacuum pump from propagating to the vacuum chamber.

As the damper, for example, a thin and stainless steel made member (bellows) the peripheral surface of which is bent in a bellows form, the member being coated with an elastic material such as silicone rubber, is used. When the vacuum pump is in use, a hose band etc. are mounted on the damper from the outside to tighten the damper.

The damper is preferably set so that the natural frequency of the whole of the damper system is low (for example, 100 Hz or lower) to increase the damping characteristics, that is, to improve the vibration isolating properties.

The natural frequency can be reduced by decreasing the rigidity and damping coefficient of damper.

However, since the damper is arranged in the air, a structure capable of withstanding a difference in pressure between a vacuum pumping flow path and the atmosphere is necessary. Therefore, the damper requires a certain degree of high rigidity. That is to say, there is a limit in decreasing the rigidity of damper.

At the time of acceleration or deceleration when the vacuum pump is started or stopped, the number of revolutions of the rotor passes through the natural frequency of the whole of the damper system. At this time, namely, when the frequency of rotor and the natural frequency of the whole of the damper system coincide with each other, resonance occurs.

Also, in some cases, vibrations of this frequency are excited by a force supporting the rotor or disturbance transmitted from a pipe etc. In particular, on a band near the natural frequency, vibrations sometimes increase remarkably as compared with the case where the damper is not used.

The resonance phenomenon produces large vibrations even under a low force. However, the displacement (vibration amplitude) at the time of resonance can be decreased by increasing the damping coefficient of the whole of the damper system.

To reduce the influence exerted by such resonance, the damper is required to have a certain degree of high damping coefficient. That is to say, there is also a limit in decreasing the damping coefficient of damper.

Accordingly, various techniques for reducing the natural frequency of the whole of the damper system have conventionally been proposed, including patent documents described below.

Patent Document 1: Japanese Unexamined Patent Application Publication No. 59-221482

Patent Document 1: Japanese Utility Model Registration No. 3092699

Patent Document 1 proposes a technique in which a balancing vacuum chamber is provided to cancel a suction force that the vacuum pump is subjected to. By providing such a balancing vacuum chamber, a compressive force acting on the bellows can be restrained. Thereby, the bellows can be caused to function with a substantially free length even if the bellows is formed by a softer member, so that the natural frequency of the whole of the damper system can be reduced.

Also, Patent Document 2 proposes a technique in which the force of evacuation is received by a stranded wire. By the configuration capable of withstanding the vacuum force using the stranded wire, the natural frequency of the damper can be reduced.

However, in the case where the natural frequency of the whole of the damper system is reduced by decreasing the damping coefficient, the stability of vacuum pump at the time when the vacuum pump is subjected to disturbance may be impaired.

Also, in the case where the natural frequency of the whole of the damper system is reduced by decreasing the rigidity of damper, the vacuum pump may become incapable of being supported stably when the vacuum pump is installed in an upside down posture (the suction port is directed downward) or in a horizontal posture (directed horizontally). Specifically, in the case where the vacuum pump is installed in an upside down posture or in a horizontal posture, deflection or tilt may be produced by the own weight of vacuum pump. If a trouble such as deflection or tilt occurs, the degree of freedom (flexibility) of installation posture of vacuum pump is restricted.

SUMMARY OF THE INVENTION

Accordingly, an object of the present invention is to provide a damper capable of reducing vibrations on a particular frequency band while the degree of freedom (flexibility) of installation posture of a vacuum pump is maintained, and a vacuum pump.

To achieve the above object, the invention provides a damper which is disposed between a vacuum system and a vacuum pump for evacuating the vacuum system and restrains the propagation of vibrations produced in the vacuum pump to the vacuum system, characterized in that the damper includes a first vibration absorbing member provided with a spring element having a spring constant k and a mass element having a mass m in a vibration absorption analysis model for restraining vibration energy; and a second vibration absorbing member which is arranged at a position such as not to be in contact with the first vibration absorbing member and is provided with a spring element having a spring constant K and a damping element having a viscosity damping coefficient C, and the first vibration absorbing member and the second vibration absorbing member form a notch filter type vibration isolating structure having a steep damping characteristic in a particular frequency band.

The invention is further characterized in that the first vibration absorbing member is formed by a thin-wall cylindrical member the peripheral surface of which is of a bellows shape, and the second vibration absorbing member is formed by an elastic member and is disposed at the outer periphery of the thin-wall cylindrical member.

The invention is further characterized in that the vacuum pump has a suction port, an exhaust port, and a gas transfer mechanism for transferring gas from the suction port to the exhaust port; the gas transfer mechanism transfers gas by means of the rotating action of a rotating body included in the vacuum pump; a center frequency fc of the particular frequency band in the notch filter type vibration isolating structure is determined by the natural frequency of the first vibration absorbing member; and elements in the first vibration absorbing member and the second vibration absorbing member are configured so that the center frequency fc of the particular frequency band substantially coincide with the rotation frequency of the rotating body.

The natural frequency of the first vibration absorbing member may include a natural frequency of, for example, second order or higher.

The invention is further characterized in that the center frequency fc of the particular frequency band is adjusted by changing the natural frequency of the thin-wall cylindrical member.

The invention is further characterized in that both ends of the thin-wall cylindrical member are fixed to a first member and a second member; both ends of the elastic member are also fixed to the first member and the second member; and the natural frequency of the thin-wall cylindrical member changes a clearance between the first member and the second member, by which the extension amount of the thin-wall cylindrical member is adjusted.

The invention is further characterized in that the clearance between the first member and the second member is adjusted by inserting a spacer between at least one member of the first member and the second member and the elastic member or by forming a gap using an adjustment screw.

The invention is further characterized in that the clearance between the first member and the second member is adjusted by changing a clearance between at least one member of the first member and the second member and the elastic member by using an actuator.

The invention is further characterized in that the clearance between the first member and the second member is changed based on the rotation frequency of the rotating body.

In another aspect, the invention is also directed to a vacuum pump provided with the damper according to the present invention.

According to the present invention, the notch filter type vibration isolating structure is formed by using the first vibration absorbing member provided with the spring element having a spring constant k and the mass element having a mass m and the second vibration absorbing member provided with the spring element having a spring constant K and the damping element having a viscosity damping coefficient C, by which vibrations on a particular frequency band can be reduced properly.

BRIEF DESCRIPTION OF THE DRAWINGS

FIG. 2($a$) is a schematic view showing a model of convention damper device, and FIG. 2($b$) is a schematic showing a model of a damper section in accordance with an embodiment of the present invention;

DESCRIPTION OF THE PREFERRED EMBODIMENTS

A preferred embodiment of the present invention will now be described in detail with reference to FIGS. 1 to 9. In this embodiment, explanation is given by using a turbo-molecular pump as one example of a vacuum pump.

Figure 1:
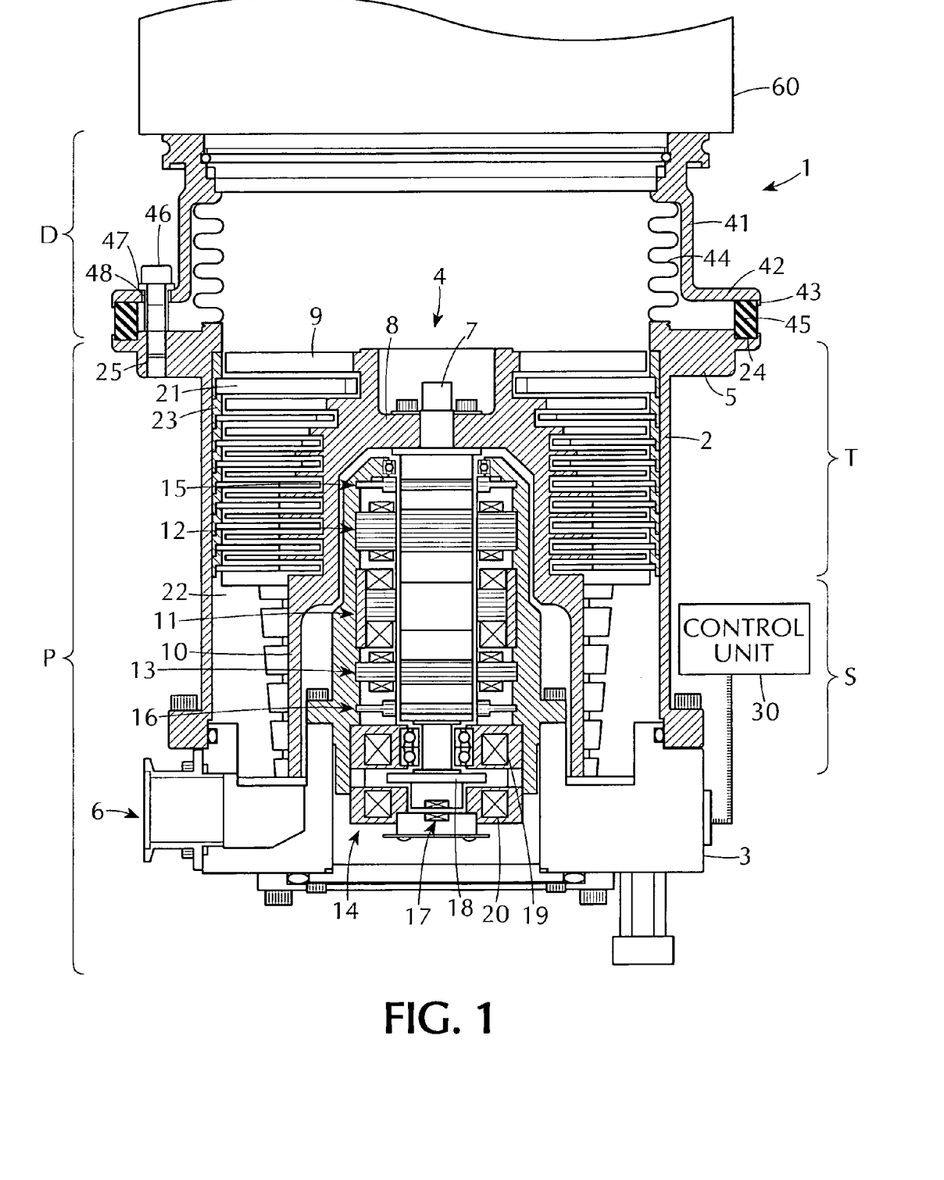
FIG. 1 is a configuration view showing a construction of a turbo-molecular pump provided with a damper section in accordance with an embodiment of the present invention.

FIG. 1 is a configuration view showing a construction of a turbo-molecular pump 1 provided with a damper section D in accordance with this embodiment. FIG. 1 shows a cross section in the axial direction.

FIG. 1 also shows a part of a vacuum system 60 connected to the turbo-molecular pump 1.

The turbo-molecular pump 1 in accordance with this embodiment consists of the damper section D and a pump section P. Further, the pump section P includes a turbo-molecular pump section T and a thread groove pump section S.

A casing 2 that forms an exterior body of the pump portion P of the turbo-molecular pump 1 has a substantially cylindrical shape, and forms a housing for the pump section P together with a base 3 provided under (on the exhaust port 6 side of) the casing 2. In this housing, a structure for performing the evacuating function of the turbo-molecular pump 1, namely, a gas transfer mechanism is housed.

This gas transfer mechanism is broadly made up of a pivotally supported rotating section and a stationary section fixed to the housing.

At the end of the casing 2, a suction port 4 for introducing gas into the pump portion P of the turbo-molecular pump 1 is formed. Also, on the end surface on the suction portion 4 side of the casing 2, a flange portion 5 projecting to the outer periphery side is formed.

Also, the base 3 is formed with an exhaust port 6 for exhausting gas from the turbo-molecular pump 1.

The rotating section includes a shaft 7, which is a rotating shaft, a rotor 8 disposed on the shaft 7, rotating blades 9 provided on the rotor 8, and a cylindrical member 10 provided on the exhaust port 6 side (the thread groove pump section S).

The rotating blades 9 consist of blades extending radially from the shaft 7 so as to be inclined through a predetermined angle from a plane perpendicular to the axis of the shaft 7.

Also, the cylindrical member 10 consists of a member having a cylindrical shape concentric with the rotation axis of the rotor 8.

In an intermediate portion is the axial direction of the shaft 7, a motor section 11 for rotating the shaft 7 at a high speed is provided. In this embodiment, as one example, the motor section 11 is a DC brushless motor configured as described below.

In the motor section 11, a permanent magnet is fixed around the shaft 7. The permanent magnet is fixed around the shaft 7 so that, for example, the N pole and the S pole are arranged every 180 degrees. Around the permanent magnet, for example, six electromagnets are arranged every 60 degrees so as to face symmetrically to the axis of the shaft 7 with a predetermined clearance being provided with respect to the shaft 7.

Also, the turbo-molecular pump 1 is fitted with a rotational speed sensor. A control unit 30 can detect the number of revolutions of the shaft 7 from the detection signal of the rotational speed sensor.

Further, the turbo-molecular pump 1 is fitted with a phase sensor for detecting the phase of rotation of the shaft 7, the phase sensor being provided near the motor section 11. The control unit 30 detects the position of the permanent magnet from the both of the detection signals of the phase sensor and the rotational speed sensor.

The control unit 30 successively changes over the current of the electromagnet according to the detected position of the magnet pole so that the rotation of the shaft 7 continues. That is to say, the control unit 30 yields a rotating magnetic field around the permanent magnet fixed to the shaft 7 by changing over the exciting current of the six electromagnets, and rotates the shaft 7 by causing the permanent magnet to follow the rotating magnetic field.

On the suction port 4 side and the exhaust port 6 side with respect to the motor section 11 of the shaft 7, magnetic bearing sections 12 and 13 for pivotally supporting the shaft 7 in the radial direction are provided, respectively, and at the lower end of the shaft 7, a magnetic bearing section 14 for pivotally supporting the shaft 7 in the axial direction is provided.

These magnetic bearing sections 12 and 14 form a 5-axis control type magnetic bearing.

The shaft 7 is supported in the radial direction (the radial direction of the shaft 7) in a noncontact manner by the magnetic bearing sections 12 and 13, and is supported in the thrust direction (the axial direction of the shaft 7) in a noncontact manner by the magnetic bearing section 14.

Also, near the magnetic bearing sections 12 to 14, displacement sensors 15 to 17 for detecting the displacement of the shaft 7 are provided, respectively.

In the magnetic bearing section 12, four electromagnets are arranged every 90 degrees around the shaft 7 so as to face to each other. The shaft 7 is formed of, for example, a material having high magnetic permeability (such as iron), and is attracted by the magnetic force of these electromagnets.

The displacement sensor 15 detects the radial displacement of the shaft 7 by performing sampling at predetermined time intervals. If the displacement of the shaft 7 in the radial direction from a predetermined position is detected from the displacement signal of the displacement sensor 15, the control unit 30 operates so that the magnetic force of the electromagnets is adjusted to return the shaft 7 to the predetermined position. The adjustment of the magnetic force of the electromagnets is made by feedback control of the exciting currents of the electromagnets.

The control unit 30 feedback controls the magnetic bearing section 12 based on the signal of the displacement sensor 15. Thereby, the shaft 7 is magnetically levitated in the radial direction from the electromagnets in the magnetic bearing section 12 with a predetermined clearance being provided, and is held in the air in a noncontact manner.

The configuration and operation of the magnetic bearing section 13 is the same as those of the magnetic bearing section 12. The control unit 30 feedback controls the magnetic bearing section 13 based on the signal of the displacement sensor 16. Thereby, the shaft 7 is magnetically levitated in the radial direction in the magnetic bearing section 13, and is held in the air in a noncontact manner.

Thus, the shaft 7 is held at the predetermined position in the radial direction by the action of the magnetic bearing sections 12 and 13.

Also, the magnetic bearing section 14 includes a disc-shaped metal disc 18 and electromagnets 19 and 20, and holds the shaft 7 in the thrust direction.

The metal disc 18, which is formed of a material having high magnetic permeability such as iron, is fixed perpendicularly to the shaft 7 in the center thereof. The electromagnet 19 is provided above the metal disc 18, and the electromagnet 20 is provided below the metal disc 18. The electromagnet 19 attracts the metal disc 18 upward by means of the magnetic force, and the electromagnet 20 attracts the metal disc 18 downward. The control unit 30 suitably adjusts the magnetic forces applied to the metal disc 18 by the electromagnets 19 and 20, and magnetically levitates the shaft 7 in the thrust direction to hold the shaft 7 in the air in a noncontact manner.

The displacement sensor 17 detects the displacement in the thrust direction of the shaft 7 by sampling, and sends the displacement detection signal to the control unit 30. The control unit 30 detects the displacement in the thrust direction of the shaft 7 from the displacement detection signal received from the displacement sensor 17.

When the shaft 7 moves in either direction of the thrust direction and is displaced from the predetermined position, the control unit feedback controls the exciting currents of the electromagnets 19 and 20 so as to correct this displacement, and operates so that the magnetic force is adjusted to return the shaft 7 to the predetermined position. The control unit 30 carries out this feedback control continuously. Thereby, the shaft 7 is magnetically levitated in the thrust direction at the predetermined position and is held.

As described above, the shaft 7 is held in the radial direction by the magnetic bearing sections 12 and 13, and is held in the thrust direction by the magnetic bearing section 14, so that the shaft 7 rotates around the axis of the shaft 7.

On the inner periphery side of the housing, the stationary section is formed. The stationary section includes stationary blades 21 provided on the suction port 4 side (the turbo-molecular pump section) and a thread groove spacer 22 provided on the inner peripheral surface of the casing 2.

The stationary blades 21 consist of blades extending from the inner peripheral surface of the housing toward the shaft 7 so as to be inclined through a predetermined angle from a plane perpendicular to the axis of the shaft 7.

The stationary blades 21 at stages are separated from each other by cylindrically shaped spacers 23.

In the turbo-molecular pump section T, the stationary blades 21 and the rotating blades 9 are formed alternately in the axial direction at plural stages.

The thread groove spacer 22 is formed with a spiral groove in the surface opposed to the cylindrical member 10. The thread groove spacer 22 is formed so as to face to the outer peripheral surface of the cylindrical member 10 with a predetermined clearance (gap) being provided therebetween. The direction of the spiral groove formed in the thread groove spacer 22 is a direction such that gas is directed to the exhaust port 6 when the gas is transported in the rotation direction of the shaft 7 in the spiral groove.

Also, the depth of the spiral groove decreases toward the exhaust port 6, so that the gas transported in the spiral groove is compressed as the gas approaches the exhaust port 6.

By the pump section P of the turbo-molecular pump 1 constructed as described above, the evacuation in the vacuum system 60 is carried out.

The vacuum system 60 requires the exhaust of a process gas as in the case of a chamber for etching a semiconductor device or requires a high vacuum as in the case of a chamber in which an observation sample of an electron microscope is placed. In the vacuum system 60 as described above, the propagation of vibrations produced in the pump section P of the turbo-molecular pump 1 is unpreferable because the propagated vibrations may become hindrance to the performance of the system.

Thereupon, the turbo-molecular pump 1 in accordance with this embodiment is connected to the vacuum system 60 via the damper section D. The damper section D is provided to absorb vibrations (including minute vibrations, for example, on the micron order or the nano order) produced in the pump section P of the turbo-molecular pump 1.

The damper section D has a hollow cylindrical member 41. On the pump section P-side end surface of the cylindrical member 41, a flange portion 42 projecting to the outer periphery side is formed. This flange portion 42 and the flange portion 5 of the pump section P face to each other.

The cylindrical member 41 is formed of a metal (for example, an aluminum alloy or stainless steel) having the same quality of material as that of the casing 2 of the pump section P.

Also, the other end of the cylindrical member 41 is fixed to the peripheral edge portion of exhaust port of the vacuum system 60.

An elastic member 45 (elastomer) is arranged in a state of being held between the flange portion 42 of the cylindrical member 41 and the flange portion 5 of the pump section P. The elastic member 45 functions as a second vibration absorbing member. Also, the cylindrical member 41 functions as a first member, and the flange portion 5 functions as a second member.

The elastic member 45, which is a ring-shaped member (cylindrical member), is formed of a rubber material such as silicone rubber. The elastic member 45 may be formed of a gel material.

The flange portion 5 of the pump section P is formed with a ring-shaped concave groove 24 on the surface facing to the flange portion 42 of the damper section D.

One end side of the elastic member 45 is fixed by being fitted in the concave groove 24. The other end of the elastic member 45 is pressed by the flange portion 42 of the damper section D.

At the outer peripheral edge of the flange portion 42, a stopper portion 43 projecting toward the pump section P is formed. This stopper portion 43 is a positional shift preventive member for preventing the elastic member 45 from shifting to the outer periphery side of the flange portion 42.

Further, the stopper portion 43 also functions as a positioning member when the elastic member 45 is held between the flange portion 42 and the flange portion 5.

A method for fixing the damper section D to the pump section P is explained. In fixing the damper section D to the pump section P, bolts 46, spacers 47, through holes 48, and bolt holes 25 are used.

The bolt 46 is a fastening member in which a head is provided at one end of a round bar, and threads are cut on the other end side.

The spacer 47 is a positioning member for preventing the elastic member 45 from being tightened excessively by the bolt 46 when the damper section D is fixed to the pump section P.

This spacer 47 is a hollow cylindrical member, the inside diameter thereof being larger than the diameter of the bolt 46 and smaller than the diameter of the head of the bolt 46. By changing the lengthwise distance of the spacer 47, a clearance between the flange portion 42 of the damper section D and the flange portion 5 of the pump section P can be adjusted.

The through hole 48 is a through hole formed in the flange portion 42, the diameter thereof being larger than the outside diameter of the spacer 47. Also, the through hole 48 is formed on the inner periphery side of a position at which the elastic member 45 is disposed.

The bolt hole 25 is a threaded hole formed in the flange portion 5 of the pump section P, the size thereof corresponding to the shape of the bolt 46. Also, the bolt hole 25 is formed at a position facing to the through hole 48.

At the time of assembly, first, the spacer 47 is loosely inserted into the through hole 48. Then, the bolt 46 is caused to penetrate through the spacer 47. The bolt 46 is fitter in the bolt hole 25, and the bolt 46 is tightened. Thus, the damper section D is fixed to the pump section P.

The bolt 46 also has a function of restraining the flange portion 42 of the damper section D and the flange portion 5 of the pump section P from separating excessively from each other.

That is to say, the clearance between the flange portion 42 of the damper section D and the flange portion 5 of the pump section P is restrained from becoming too large by the action of the spacer 47, and is restrained from becoming too small by the action of the bolt 46.

Also, on the inside of the cylindrical member 41 of the damper section D, a bellows 44 is provided. This bellows 44 functions as a first vibration absorbing member.

The bellows 44 is a peat-shaped thin-wall pipe having a smooth chevron-shaped continuous cross section, which is formed of stainless steel. The bellows 44 achieves elasticity by the expansion and contraction of the side surface formed into a chevron shape. The bellows 44 may be of an integral type or may be of a welded type in which the chevrons are welded to each other.

Also, the openings at both ends of the bellows 44 are connected to the inner peripheral wall of the cylindrical member 41 and the flange portion 5 of the pump section. These connecting portions are formed, for example, by brazing or welding so that the gastightness in the connecting portions is secured and a sufficient strength is provided against the vibrations of the pump section P.

Next, the function of the damper section D in accordance with this embodiment configured as described above is explained in detail.

In the damper section D in accordance with this embodiment, as shown in FIG. 1, the bellows 44 is disposed on the inside of the elastic member 45 with a clearance being provided therebetween. The bellows 44 and the elastic member 45 are disposed by providing a clearance such that both of the elements do not come into contact with each other even in the case where the bellows 44 is compressed.

The bellows 44 and the elastic member 45 form a notch filter type vibration isolator.

The notch filter is a filter that gives steep damping to a particular frequency. That is to say, the notch filter type vibration isolator is a damper (vibration absorbing) device that damps the vibrations on a particular frequency band.

In the damper section D in accordance with this embodiment, the vibrations near the especially increasing rotation frequency of the rotor 8 (shaft 7) are reduced (isolated) by utilizing the characteristics that the notch filter type vibration isolator has.

Here, the characteristics of the damper section D are explained while comparing the damper section D in accordance with the present invention with the conventional damper device. Herein, the conventional damper device is of a type in which the bellows are coated with the elastic member.

FIG. 2(a) is a schematic view showing a model of the conventional damper device, and FIG. 2(b) is a schematic view showing a model of the damper section D in accordance with this embodiment.

FIGS. 2(a) and 2(b) are schematic views in which the vibration transmission from the pump section P to the vacuum system 60 is modeled.

Figure 2:
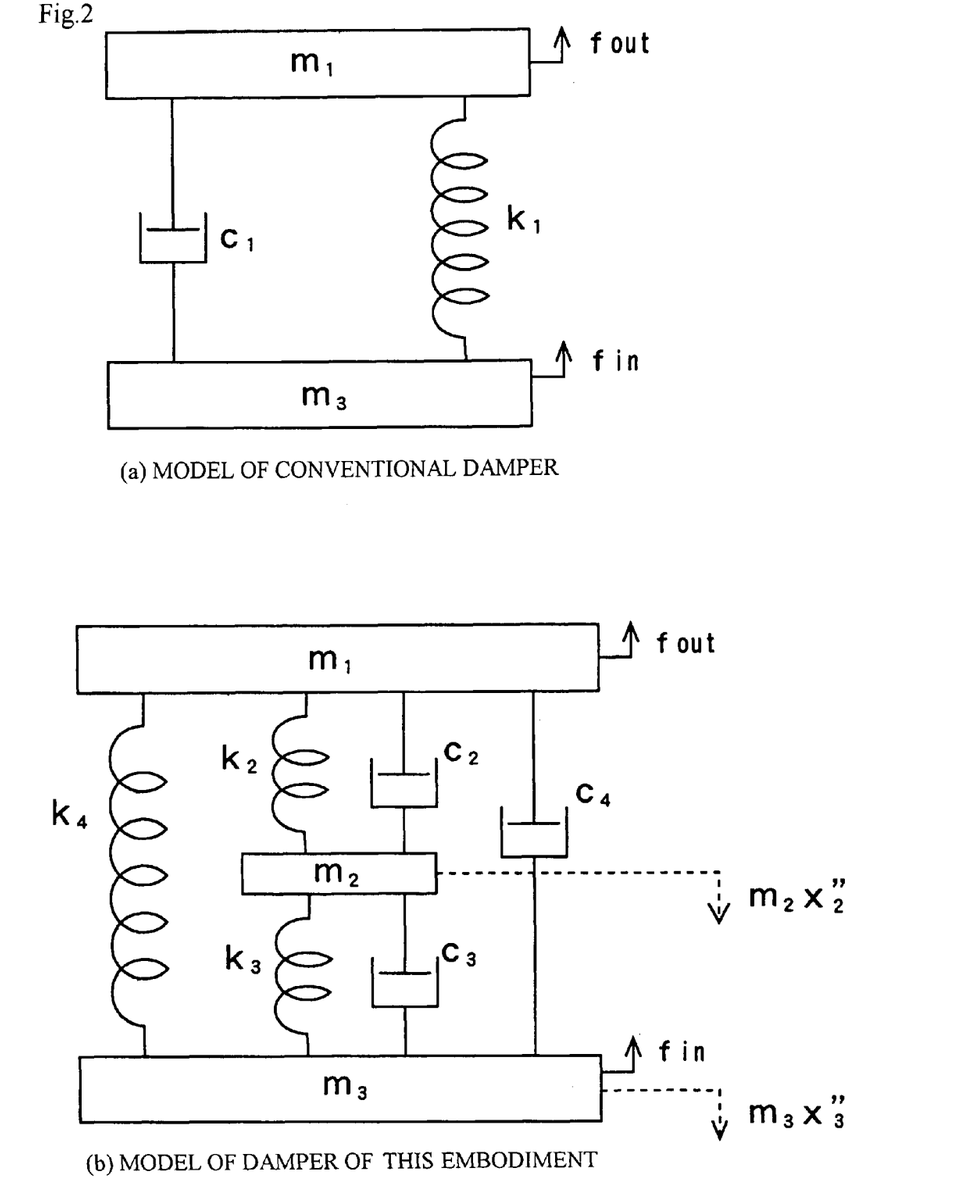

Symbols shown in FIG. 2 denote the followings:
$m_1$: mass element of the vacuum system 60
$m_2$: mass element of the bellows 44
$m_3$: mass element of the pump section P
$k_1$: spring constant of damper in which bellows is coated with elastic member
$c_1$: damping coefficient of damper in which bellows is coated with elastic member
$k_2, k_3$: spring constant of the bellows 44
$k_4$: spring constant of the elastic member 45
$c_2, c_3$: damping coefficient of the bellows 44
$c_4$: damping coefficient of the elastic member 45
fin: vibrations occurring in the pump section P of the turbo-molecular pump 1
fout: vibrations transmitted to the vacuum system 60
$x_2$: displacement of $m_2$
$x_3$: displacement of $m_3$ Also, $x''_2$ and $x''_3$ show second-order time differentials of $x_2$ and $x_3$, respectively.

The model views shown in FIG. 2 show states in the axial direction to facilitate the illustration. However, the similar characteristics are exhibited also in the radial direction.

As shown in FIG. 2(a), the conventional damper device is formed by an element having only the damping coefficient $c_1$ and the spring constant $k_1$. In the conventional damper device, the bellows and the elastic member are brought into contact with each other to provide the bellows with the damping coefficient $c_1$.

The vibration isolator having the model construction as shown in FIG. 2(a) is called a basic type.

The damping element is an element having a viscosity damping coefficient (damping coefficient $c_1$), and the spring element is an element having the spring constant $k_1$.

The model shown in FIG. 2(b) can be realized by disposing the bellows 44 and the elastic member 45 with a sufficient clearance being provided therebetween to prevent these elements from coming into contact with each other.

Next, a method for deriving a center frequency fc of a frequency band that provides steep damping (hereinafter referred to as a notch band) is explained with reference to FIG. 2.

In the conventional damper shown in FIG. 2(a), the bellows and the elastic member are brought into contact with each other and thereby the bellows and the elastic member are regarded as being integral, or the spring constant of the bellows is set so as to be small to a negligible degree, by which a basic type vibration insulator is formed.

In contrast, in the damper D in accordance with this embodiment shown in FIG. 2(b), the spring constant of the bellows 44 is set so as to be larger than that of the conventional damper, and an influence of the bellows 44 itself on the vibration transmissibility is considered.

Here, the vibration transmissibility of the damper D in accordance with this embodiment, namely, fout/fin is determined.

First, the equation of motion of vibration transmission model is expressed by using a Laplace operator(s) as follows.

$$Fout = (k_2 + c_2 s)X_2 - (k_4 + c_4 s)X_3 \qquad \text{Equation 1}$$

$$\{m_2 s^2 + (c_2 + c_3)s + (k_2 + k_3)\}X_2 = (k_3 + c_2 s)X_3$$

$$Fin = \{m_3 s^2 + (c_3 + c_4)s + (k_3 + k_4)\}X_3 - (k_3 + c_3 s)X_2$$

where $X_2$, $X_3$, Fout and Fin are Laplace transform values of $x_2$, $x_3$, fout and fin, respectively.

The above equation is solved for Fout/Fin as follows.

$$\frac{Fout}{Fin} = -\frac{\begin{array}{c} c_4 m_2 s^3 + \\ \{m_2 k_4 + c_4(c_2 + c_3) + c_2^2\}s^2 + \{c_2(k_2 + k_3 + k_4) + c_3 k_4 + c_4(k_2 + k_3)\}s + k_4(k_2 + k_3) \end{array}}{\begin{array}{c} m_2 m_3 s^4 + \{c_2 m_3 + c_3(m_2 + m_3) + c_4 m_2\}s^3 + \\ \{k_2 m_3 + k_3(m_2 + m_3) + k_4 m_2 + c_4(c_2 + c_3) + c_3^2\} \\ s^2 + \{c_2 k_4 + c_3(k_2 + k_3 + k_4) + c_4(k_2 + k_3))s + \\ \{k_2 k_3 + k_4(k_2 + k_3)\} \end{array}} \qquad \text{Equation 2}$$

If it is assumed that $c_2 = c_3 = 0$ considering that the damping of the bellows 44 itself is small enough, Equation 2 can be rewritten as follows.

$$\frac{Fout}{Fin} = -\frac{c_4 m_2 s^3 + m_2 k_4 s^2 + c_4(k_2 + k_3)s + k_4(k_2 + k_3)}{m_2 m_3 s^4 + c_4 m_2 s^3 + \{k_2 m_3 + k_3(m_2 + m_3) + k_4 m_2\}s^2 + c_4(k_2 + k_3)s + \{k_2 k_3 + k_4(k_2 + k_3)\}} \qquad \text{Equation 3}$$

In case where $k_2$ can be regarded as 0 in Equation 3, the following equation is obtained.

$$\frac{Fout}{Fin} = -\frac{(m_2s^2 + k_3)(c_4s + k_4)}{m_2m_3s^4 + c_4m_2s^3 + \{k_3(m_2 + m_3) + k_4m_2\}s^2 + c_4k_3s + k_3k_4} \quad \text{Equation 4}$$

This equation shows a notch filter characteristic in that when $m_2s^2+k_30$, the output Fout=0 regardless of the magnitude of the input Fin.

Figure 5:
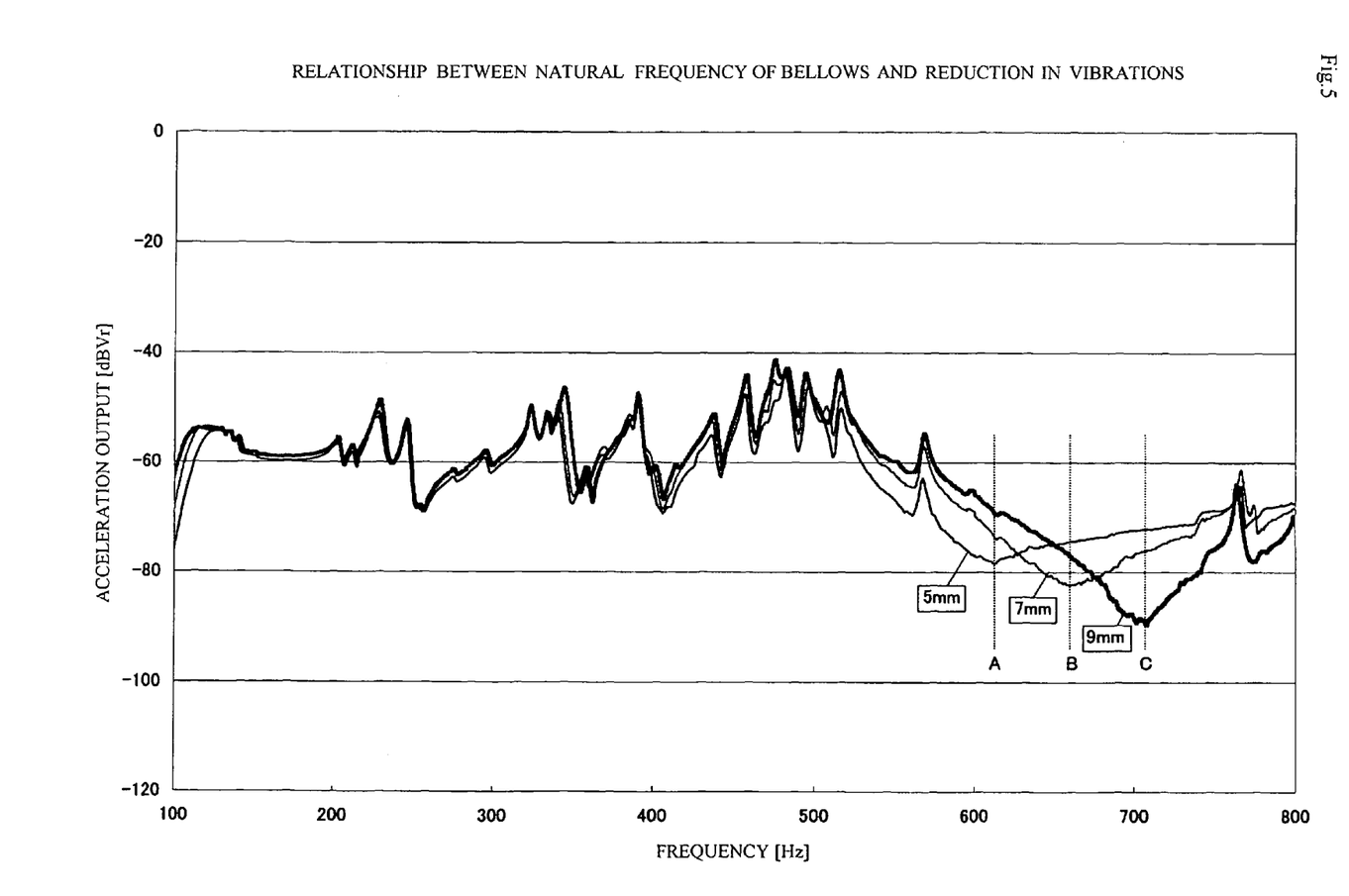
FIG. 5 is a graph showing an example (measurement example) of a state of a change in the center frequency fc on a notch band in the case where the clearance expanded by a spacer is changed.
Figure 6:
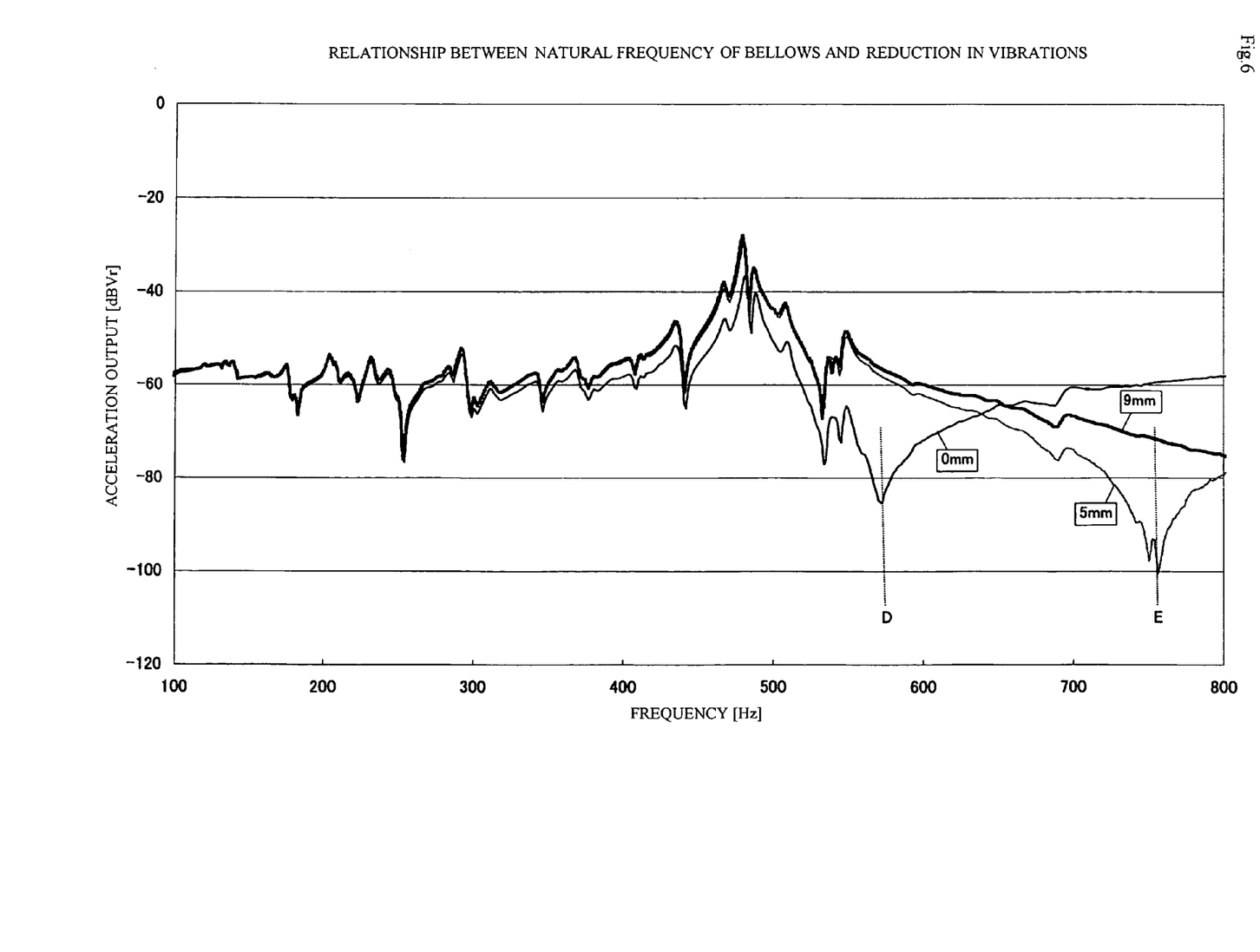
FIG. 6 is a graph showing another measurement example of a state of a change in the center frequency fc on a notch band in the case where the clearance expanded by a spacer is changed.

As shown in FIGS. 5 and 6, the notch filter characteristic is also observed by actual measurement.

Considering the Laplace operator(s) in the frequency region, since s=2πfj (where, f is frequency [Hz], and j is imaginary unit),
the center frequency fc of the notch filter is determined from $$-(2\pi fc)^2 m_2 + k_3 = 0$$

That is, the center frequency fc is expressed as $$fc = \frac{1}{2\pi}\sqrt{\frac{k_3}{m_2}} \quad \text{Equation 5}$$

Thus, fc is a natural frequency that does not depend on $k_4$, $c_4$ and $m_3$, namely that is determined by the characteristics ($m_2$ and $k_3$) of the bellows 44.

As shown in Equation 5, the center frequency fc relates to a mass element that is the own weight of the bellows 44.

The own weight of the bellows 44 is very small as compared with the masses of the pump section and the vacuum system 60. However, the vibrations to be reduced (damped) in the damper section D are minute vibrations on the micron order or the nano order, so that a sufficient damping effect can be achieved.

Figure 3:
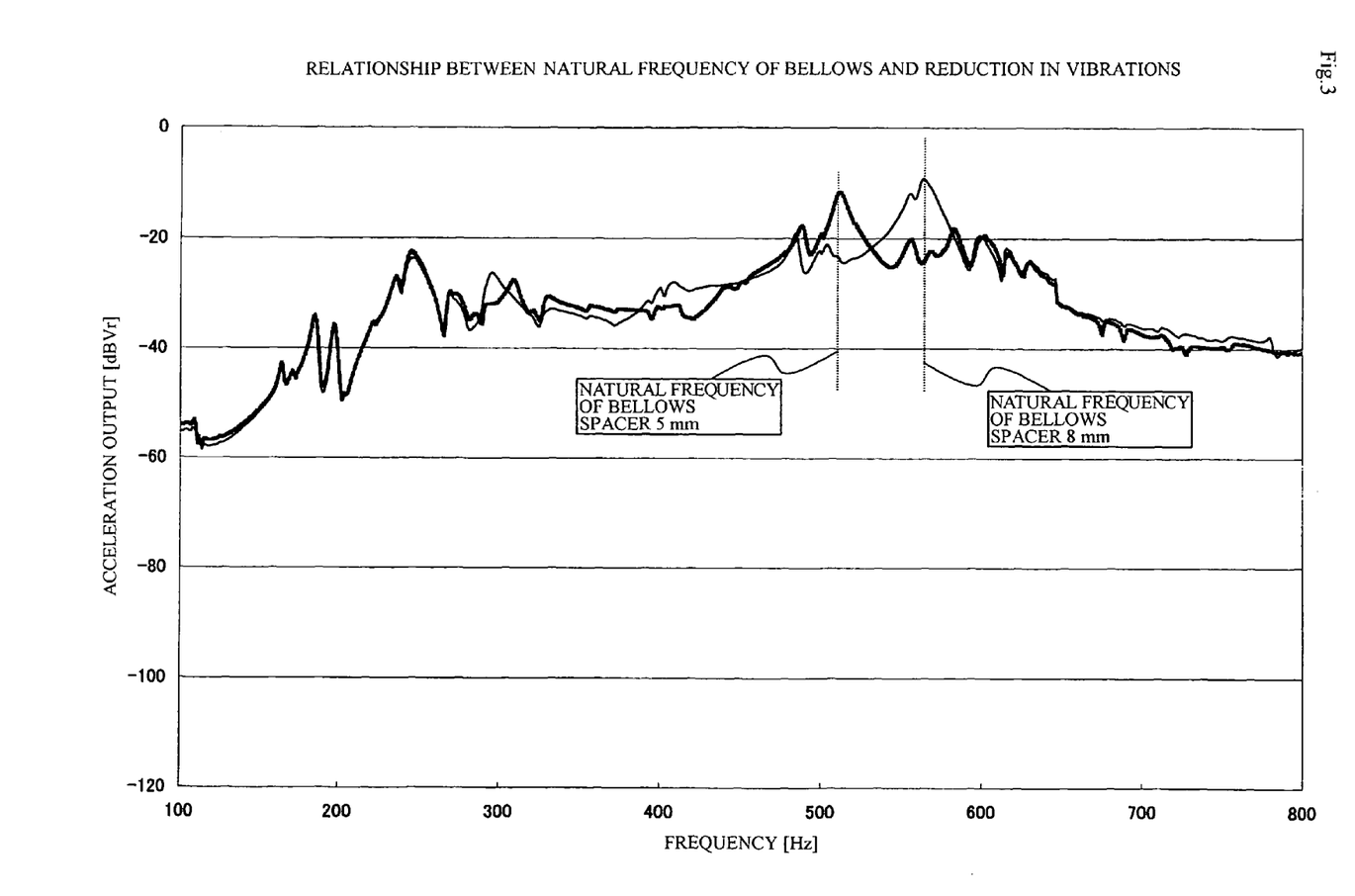
FIG. 3 is a graph showing the relationship between the natural frequency and the reduction is vibrations of a bellows.

FIG. 3 is a graph showing the result of actual measurement of the natural frequency.

When fc is measured, a metallic spacer is used in place of the elastic member 45 to eliminate the influence of $k_4$ and $c_4$.

As shown in FIG. 3, fc changes due to the adjustment of the extension amount of the bellows 44 made according to the thickness of the metallic spacer.

The results of actual measurement shown in FIGS. 3, 5 and 6 include the characteristics of a vibration absorbing element etc. provided separately on the vacuum system 60 side.

In the damper section D in accordance with this embodiment shown in FIG. 1, the constants of elements in the bellows 44 and the elastic member 45 are set so that the center frequency fc of the notch band coincides with the rotation frequency of the rotor 8 in the pump section P.

It is desirable that the center frequency fc of the notch band and the rotation frequency of the rotor 8 coincide with each other. However, if the center frequency fc of the notch band is within ±40% of the rotation frequency of the rotor 8, sufficient damping on the notch band can be anticipated.

In the actual system, the damping is not 0 (zero), and a band of vibration reducing effect with some degree of width (band) appears around the center frequency fc of the notch band. This band width depends on the magnitude of damping. In the case where the bellows 44 is used as the first vibration absorbing member as it is, if the center frequency fc of the notch band is within ±40% of the rotation frequency of the rotor 8, the vibration reducing effect can be anticipated sufficiently (having been proved using an actual machine). As the rotation frequency of the rotor 8 approaches the center frequency fc, the vibration reducing effect increases.

Thus, in this embodiment shown in FIG. 1, the bellows 44 and the elastic member 45 are arranged with a clearance enough to prevent the contact of these elements being provided, and the elastic member 45 is provided with a spring element K and a damping element C and the bellows 44 is provided with a spring element k and a mass element m. Thereby, a notch filter type vibration insulator is formed.

The bellows 44 and the elastic member 45 are set so as to have constants of elements such that the center frequency fc of the notch band is in the vicinity (within ±40%) of the rotation frequency of the rotor 8. The quality of material and the extension amount of member are adjusted so as to coincide with the constant of each element.

For example, in the case where the rotational speed of the rotor 8 is 30,000 rpm, the rotation frequency of the rotor 8 is 500 Hz. In this case, the bellows 44 and the elastic member 45 are set so as to have constants such that the center frequency fc of the notch band is in the range of 300 to 700 Hz.

By the notch filter type vibration isolator formed by the bellows 44 and the elastic member 45 in this manner, vibrations of a particular frequency, namely, vibrations of rotation frequency band of the rotor 8 can be damped properly.

However, the extension range of the bellows 44 is set at a range in which the integral type bellows 44 is not damaged.

Also, the turbo-molecular pump 1 in which the pump section P and the damper section D are integrated can be made small in size in terms of construction as compared with the case where these sections are formed separately. Further, not only the workability at the time of installation to the vacuum system 60 can be improved, but also the installation strength at the abnormal time, for example, at the time when the turbo-molecular pump 1 is broken can be secured easily.

As can be seen from the above-described calculation equation for determining the center frequency fc of the notch band, the center frequency fc of the notch band changes due to the change of the natural frequency of the fellows 44.

The natural frequency of the bellows 44 also changes according to the quality of material and the shape of the bellows 44 or the extension amount (tension deformation or shape change) of the bellows 44.

Generally, a chord and a thin film have a property (characteristic) that the natural frequency increases as the tension becomes higher because the restoring force increases. It could be verified by actual measurement that the bellows 44 in accordance with this embodiment also has such a property.

Since it is difficult to directly adjust the tension, in this embodiment, the extension amount of the bellows 44 is adjusted by a mechanical means or the like.

Next, a vacuum pump is explained which is provided with the damper section D having a mechanism for adjusting the center frequency fc of the notch band, the mechanism utilizing a characteristic in that the frequency of the center frequency fc of the notch band changes based on the extension amount of the bellows 44.

Figure 4:
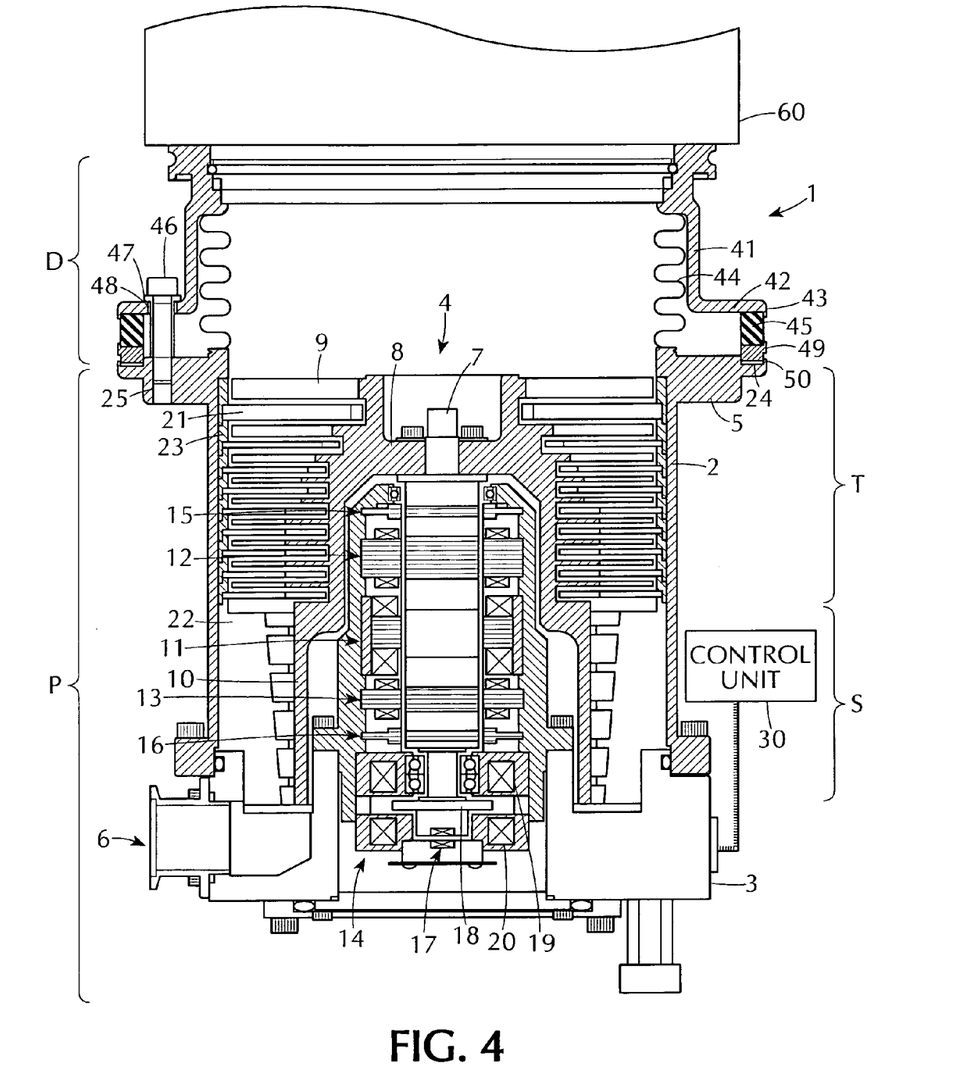
FIG. 4 is a configuration view showing a construction of a turbo-molecular pump provided with a damper section having a mechanism for adjusting the center frequency fc on a notch band.

FIG. 4 is a configuration view showing the construction of the turbo-molecular pump 1 provided with the damper section D having a mechanism for adjusting the center frequency fc of the notch band.

The same reference numerals are applied to the same elements (duplicated portions) as those of the turbo-molecular pump 1 shown in FIG. 1, and the detailed explanation thereof is omitted.

In the turbo-molecular pump 1 shown in FIG. 4, the damper section D has the mechanism for adjusting the center frequency fc of the notch band.

The mechanism for adjusting the center frequency fc of the notch band is formed by a main spacer 49 and an adjustment spacer 50.

The main spacer 49, which is a ring-shaped metallic member, functions to expand the clearance (distance) between the flange portion 42 of the cylindrical member 41 and the flange portion 5 of the pump section P by being inserted between the elastic member 45 and the flange portion 5 of the pump section P.

The adjustment spacer 50 is a ring-shaped metallic member for making fine adjustment when the clearance (distance) between the flange portion 42 of the cylindrical member 41 and the flange portion 5 of the pump section P is expanded, which is inserted between the main spacer 49 and the flange portion 5.

In the embodiment shown in FIG. 4, one adjustment spacer 50 is inserted. However, in the case where the clearance (distance) between the flange portion 42 of the cylindrical member 41 and the flange portion 5 of the pump section P is smaller than a predetermined value, a plurality of adjustment spacers 50 are inserted to make adjustment.

By expanding the clearance (distance) between the flange portion 42 of the cylindrical member 41 and the flange portion 5 of the pump section P by using the main spacer 49 and the adjustment spacer 50 in this manner, the extension amount of the bellows 44 is changed.

By the change of the extension amount of the bellows 44, the center frequency fc of the notch band is changed. Specifically, the center frequency fc of the notch band changes in the increasing direction.

FIG. 5 is a graph showing an example (measurement example) of a state of a change in the center frequency fc of the notch band in the case where the clearance expanded by the spacer is changed.

Also, FIG. 6 is a graph showing another measurement example of a state of a change in the center frequency fc on a notch band in the case where the clearance expanded by the spacer is changed.

In another measurement example shown in FIG. 6, measurement is made by using a bellows that is designed with a parameter different from the parameter used when the measurement shown in FIG. 5 is made.

The clearance expanded by the spacer exhibits the total value of the main spacer 49 and the adjustment spacer 50.

As shown in FIG. 5, it is found that as the clearance expanded by the spacer increases from 5 mm to 7 mm to 9 mm, the center frequency fc of the notch band changes toward the high frequency side from point A to point B to point C.

Also, as shown in FIG. 6, it is found that as the clearance expanded by the spacer increases from 0 mm to 5 mm to 7 mm, the center frequency fc of the notch band changes toward the high frequency side from point D to point E.

From the graphs shown in FIGS. 5 and 6, it is found that even in the case where the center frequency fc of the notch band changes toward the high frequency side, the response on the low frequency side does not change greatly.

Thus, the center frequency fc of the notch band can be changed easily by expanding the clearance (distance) between the flange portion 42 and the flange portion 5.

For example, even in the case where the first vibration absorbing member (the bellows 44) and the second vibration absorbing member (the elastic member 45) are arranged so as to be separate from each other, the notch characteristic appears on a relatively low frequency band in the case where the spring constant of the bellows 44 is set so as to be small like the conventional example.

Since the response of a frequency band greatly separating from the notch band does not change greatly, in the damper in which the notch characteristic appears on a low frequency band, the vibration damping (reducing) effect on the rotation frequency band of the rotor 8 due to the notch characteristic cannot be achieved sufficiently. That is to say, it can be said that design considering the vibration damping (reduction) on the rotation frequency band of the rotor 8 due to the notch characteristic has not been made.

By adjusting the clearance (distance) between the flange portion 42 and the flange portion 5, which is expanded by the main spacer 49 and the adjustment spacer 50 as described above, namely, by adjusting the natural frequency of the bellows 44 by changing the extension amount (tension or shape) of the bellows 44, the center frequency fc of the notch band can easily be brought close to the rotation frequency of the rotor 8. Thereby, the vibrations on the rotation frequency band of the rotor 8 can be damped (reduced) properly.

In the case where a fixing system is used in which the number of adjustment spacers 50 is changed in adjusting the center frequency fc of the notch band in this manner, the center frequency fc of the notch band is set at the time of shipment of the turbo-molecular pump 1, by which looseness etc. occurring during transportation and during use can be restrained.

Next, a modification of the above-described (FIG. 4) mechanism for adjusting the center frequency fc of the notch band is explained.

Figure 7:
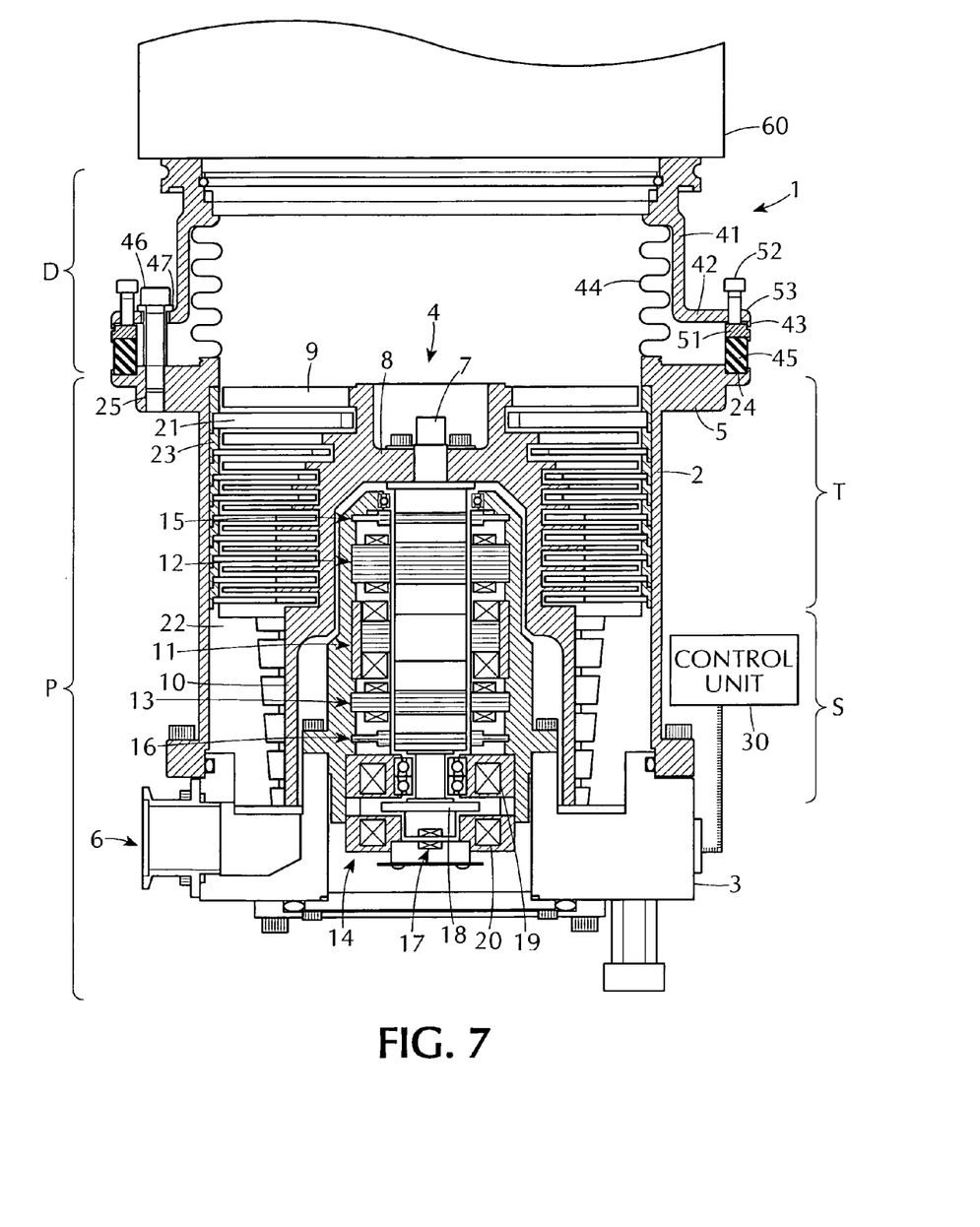
FIG. 7 is a configuration view showing a construction of a turbo-molecular pump provided with a damper section having a mechanism (modification 1) for adjusting the center frequency fc on a notch band.

FIG. 7 is a configuration view showing the construction of the turbo-molecular pump 1 provided with the damper section D having a mechanism (modification1) for adjusting the center frequency fc of the notch band.

The same reference numerals are applied to the same elements (duplicated portions) as those of the above-described turbo-molecular pump 1 shown in FIGS. 1 and 4, and the detailed explanation thereof is omitted.

In the modification of the mechanism for adjusting the center frequency fc of the notch band shown in FIG. 7, fine adjustment of the expanded clearance (distance) between the flange portion 42 and the flange portion 5, which is made by the adjustment spacer 50 in the mechanism for adjusting the center frequency fc of the notch band shown in FIG. 4, is made by using an adjustment screw 52.

Specifically, the mechanism (modification 1) for adjusting the center frequency fc of the notch band shown in FIG. 7 is formed by a main spacer 51, the adjustment screw 52, and a threaded hole 53.

The main spacer 51, which is a ring-shaped metallic member similar to the main spacer 49 used in FIG. 4, functions to expand the clearance (distance) between the flange portion 42 of the cylindrical member 41 and the flange portion 5 of the pump section P by being inserted between the elastic member 45 and the flange portion 42 of the cylindrical member 41.

The adjustment screw 52 is fitted in the threaded hole 53 formed at a position facing to the main spacer 51 in the outer peripheral portion of the flange portion 42. By adjusting the tightening amount of the screw in a state in which the tip end portion of the adjustment screw 52 is in contact with a surface facing to the vacuum system 60 of the main spacer 51, the clearance between the main space 51 and the flange portion 42 is adjusted.

When the adjustment screw 52 is tightened in the right-hand thread direction, the tip end portion thereof fitted in the threaded hole 53 penetrates the threaded hole 53, and is pushed against the main spacer 52. Herein, by adjusting the length of the tip end portion of the adjustment screw 52 penetrating the screw hole 53, the clearance between the main spacer 51 and the flange portion 42 is changed.

That is to say, by changing the tightening amount of the adjustment screw 52, the extension amount of the bellows 44 is adjusted.

In the case where the clearance between the main spacer 51 and the flange portion 42 is adjusted by using the adjustment screw 52 in this manner, the adjustment value of clearance can be changed continuously, finer adjustment can be made that the case where the adjustment is made by using the adjustment spacer 50.

Also, in the case where a semi-fixing system is used in which the tightening amount of the adjustment screw 52 is changed in adjusting the center frequency fc of the notch band, the adjustment of the center frequency fc of the notch band can be made easily after the damper section D has been assembled, so that the assembling ability can be increased. Further, not only the adjustment can be made according to the time change during use, but also proper adjustment suited to the system characteristic can be made easily after the vacuum system 60 has been installed.

Next, another modification of the above-described (FIG. 4) mechanism for adjusting the center frequency fc of the notch band is explained.

Figure 8:
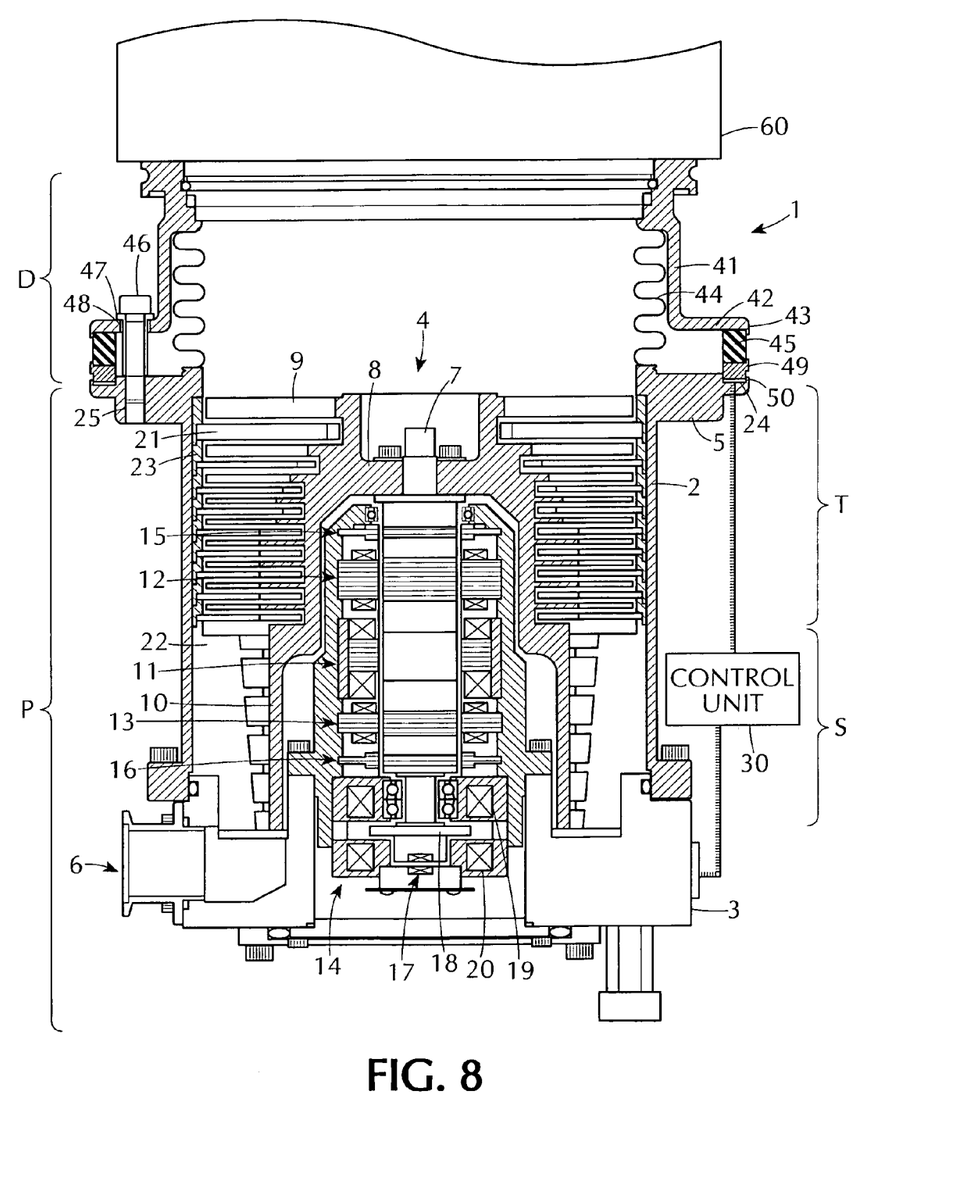
FIG. 8 is a configuration view showing a construction of a turbo-molecular pump provided with a damper section having a mechanism (modification 2) for adjusting the center frequency fc on a notch band.

FIG. 8 is a configuration view showing the construction of the turbo-molecular pump 1 provided with the damper section D having a mechanism (modification 2) for adjusting the center frequency fc of the notch band.

The same reference numerals are applied to the same elements (duplicated portions) as those of the above-described turbo-molecular pump 1 shown in FIGS. 1 and 4, and the detailed explanation thereof is omitted.

In the modification of the mechanism for adjusting the center frequency fc of the notch band shown in FIG. 8, fine adjustment of the expanded clearance (distance) between the flange portion 42 and the flange portion 5, which is made by the adjustment spacer 50 in the mechanism for adjusting the center frequency fc of the notch band shown in FIG. 4, is made by using an adjustment actuator 54.

Specifically, the mechanism (modification 2) for adjusting the center frequency fc of the notch band shown in FIG. 8 is formed by the main spacer 49 and the adjustment actuator 54.

The main spacer 49, which is a ring-shaped metallic member, functions to expand the clearance (distance) between the flange portion 42 of the cylindrical member 41 and the flange portion 5 of the pump section P by being inserted between the elastic member 45 and the flange portion 5 of the pump section P.

The adjustment actuator 54 is an adjusting element that converts energy provided from electricity or a fluid into mechanical power to drive the load. That is to say, the adjustment actuator 54 functions as an active spacer capable of changing the clearance based on a signal sent from the control unit 30.

By mounting the control section of the adjustment actuator 54 on the control unit 30 of the pump section P, cables and a power source can be omitted, and hence the device can be made small in size. Also, by mounting the control section of the adjustment actuator 54 on the control unit 30 of the pump section P, control that synchronizes with the control sequence of the pump section P can be carried out easily.

The adjustment actuator 54 may be of any energy mode of an electrical, hydraulic, and pneumatic mode.

As one example of actuator utilizing the electrical energy mode, a piezoelectric actuator using a piezoelectric element is available. This piezoelectric actuator is an actuator utilizing an inverse piezoelectric effect such that the application of a voltage to a dielectric substance produces a strain. As a typical ceramic piezoelectric material, barium titanate and lead zirconate titanate can be cited.

The piezoelectric actuator is suitable for fine adjustment of clearance because the obtained displacement is extremely small.

Also, as another example of actuator utilizing the electrical energy mode, an electromagnetic force actuator utilizing an electromagnetic force (voice coil) is available.

The mechanism for adjusting the center frequency fc of the notch band using the adjustment actuator 54 can carry out active control unlike the above-described clearance adjustment made by the adjustment spacer 50 or the adjustment screw 52.

Therefore, the mechanism for adjusting the center frequency fc of the notch band using the adjustment actuator 54 can make adjustment even at the time of operation of the turbo-molecular pump 1 (at the time of operation).

The rotation of the rotor 8 is accelerated and decelerated at the start and stop time. At this acceleration/deceleration time, the rotational speed changes. Specifically, at the time of acceleration/deceleration of the rotor 8, the vibration frequency also changes along with the change of rotation frequency.

Thereupon, the adjustment of the center frequency fc of the notch band using the adjustment actuator 54 is made in synchronization with the rotational speed of the rotor 8, namely, the change in rotation frequency, by which vibrations occurring at the time of acceleration/deceleration of the rotor 8 can be reduced (damped) properly.

For example, it is assumed that by expanding the clearance (distance) between the flange portion 42 of the cylindrical member 41 and the flange portion 5 of the pump section P by 4 mm, the center frequency fc of the notch band changes by about 100 Hz from about 600 Hz to about 700 Hz.

In the case where the acceleration/deceleration of the rotor 8 in the turbo-molecular pump 1 is 100 Hz/20 seconds, the adjustment actuator 54 having a dynamic characteristic of about 4 mm/20 seconds is used.

By doing this, the adjustment of the center frequency fc of the notch band can be caused to follow the acceleration/deceleration of the rotor 8, so that in this frequency range, vibrations can be reduced (damped) properly.

By adjusting the center frequency fc of the notch band by using the adjustment actuator 54 in this manner, the damping characteristic can be changed in accordance with the state of the turbo-molecular pump 1.

For example, the center frequency fc of the notch band is changed between the acceleration/deceleration time and the normal operation time, or the center frequency fc of the notch band is changed following the rotation frequency of the rotor 8, by which the damping characteristic in the vibration isolator can be changed.

Also, the center frequency fc of the notch band may be changed according to the sequence on the vacuum system 60 side.

In the adjustment actuator 54 in accordance with the present invention, since the frequency of vibration damping characteristic (notch filter characteristic) in the damper section D (vibration isolator) is controlled actively, a high speed (high response) such as to directly control the rotation frequency of the rotor 8 is not necessarily needed.

According to this embodiment, the control circuit for the adjustment actuator 54 is mounted in the control unit 30 that controls the pump section P. However, the control of the adjustment actuator 54 is not limited to this. For example, a control unit dedicated to the adjustment actuator 54, which is independent of the control unit 30 for the pump section P, may be provided.

By providing the control unit dedicated to the adjustment actuator 54 to acquire necessary signals and information from this control unit, the degree of freedom in mounting the device (degree of freedom of mounting design) can be improved.

Figure 9:
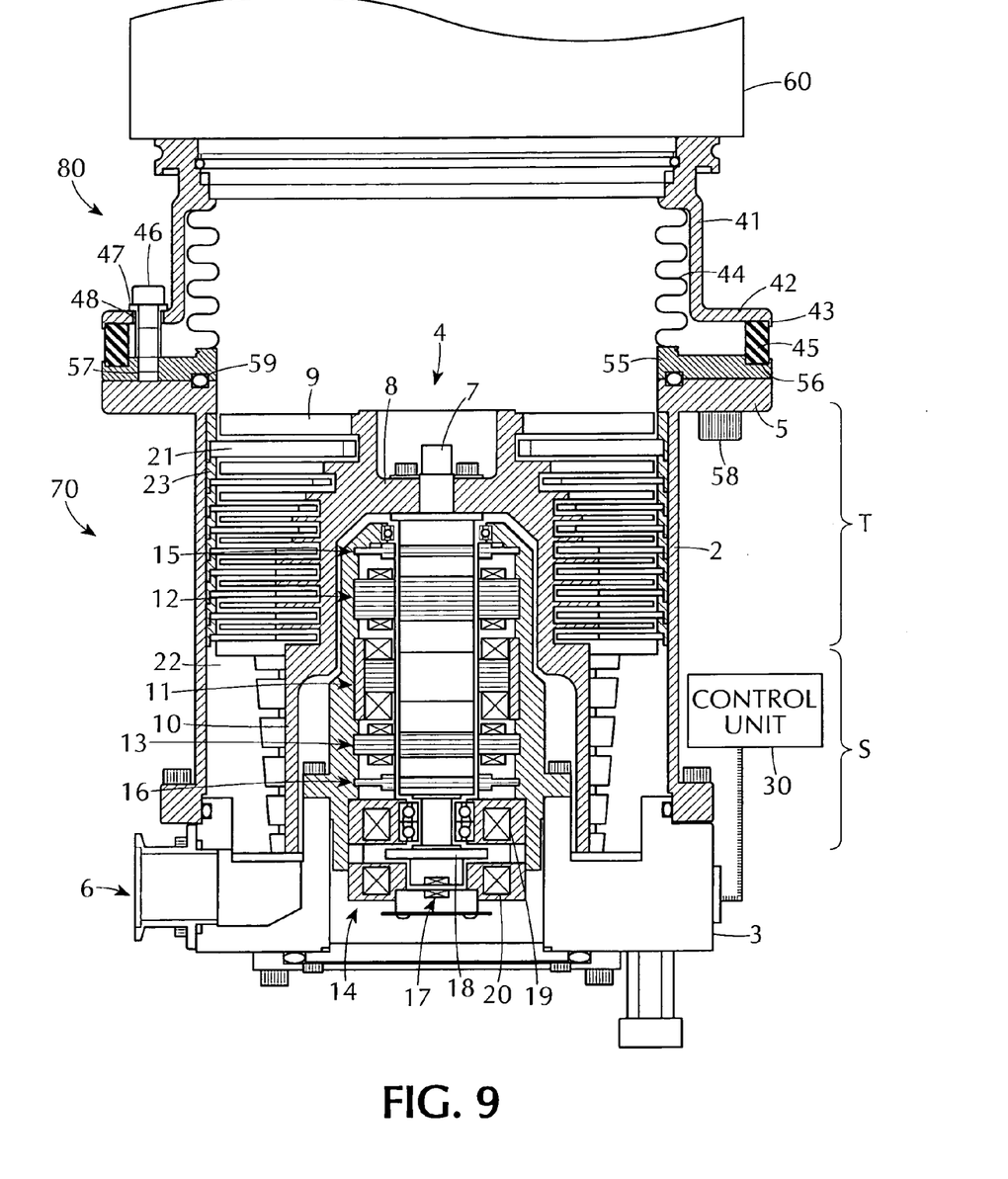
FIG. 9 is a configuration view showing an installation example of a turbo-molecular pump in the case where a damper device is constructed as a separate element.

FIG. 9 is a configuration view showing the installation example of a turbo-molecular pump 70 in the case where a damper device 80 is constructed as a separate element.

The same reference numerals are applied to the same elements (duplicated portions) as those of the turbo-molecular pump 1 shown in FIG. 1, and the detailed explanation thereof is omitted.

For the above-described turbo-molecular pump 1, an embodiment in which the damper section D is provided, namely, the damper section D is formed integrally has been explained. However, this embodiment is not limited to this configuration.

As shown in FIG. 9, the damper section D and the pump section P may be configured by the separate damper device 80 and turbo-molecular pump 70.

In this case, the damper device 80 is provided with a ring-shaped flange 55, and the bellows 44 and the elastic member 45 are disposed between the flange 33 and the cylindrical member 41.

The flange 55 is formed with a concave groove 56 and bolt holes 57. The concave groove 56 and the bolt hole 57 are provided with the same functions as those of the concave groove 24 and the bolt hole 25 formed in the flange portion 5 of the integral turbo-molecular pump 1.

The openings at both ends of the bellows 44 are connected to the inner peripheral wall of the cylindrical member 41 and the flange 55. These connecting portions are formed, for example, by brazing or welding.

One end side of the elastic member 45 is fixed by being fitted in the concave groove 56. The other end of the elastic member 45 is pressed by the flange portion 42.

The damper device 80 and the turbo-molecular pump 70 are fastened by using bolts 58. Specifically, the flange 55 of the damper device 80 and the flange portion 5 of the turbo-molecular pump 70 are connected by using the bolts 58.

At this time, an O-ring 59 is disposed between the flange 55 and the flange portion 5 to secure the gastightness in the connecting portion (joint portion) between the damper device 80 and the turbo-molecular pump 70.

The method for securing the gastightness in the connecting portion between the damper device 80 and the turbo-molecular pump 70 is not limited to the method in which the O-ring 59 is disposed. For example, a gasket seal or other sealing means may be used.

According to this embodiment, by installing the turbo-molecular pump 70 to the vacuum system 60 via the damper device 80, vibrations of a particular frequency, namely, vibrations on the rotation frequency band of the rotor 8 can be damped properly.

For the turbo-molecular pump 1 having the mechanism for adjusting the center frequency fc of the notch band using the adjustment spacer 50 shown in FIG. 4 as well, the damper section D and the pump section P may be configured separately like the damper device 80 and the turbo-molecular pump 70 shown in FIG. 9.

Also, for the turbo-molecular pump 1 having the mechanism for adjusting the center frequency fc of the notch band using the adjustment screw 52 shown in FIG. 7 and the turbo-molecular pump 1 having the mechanism for adjusting the center frequency fc of the notch band using the adjustment actuator 54 shown in FIG. 8 as well, the damper section D and the pump section P may be configured separately like the damper device 80 and the turbo-molecular pump 70 shown in FIG. 9.

As described above, according to this embodiment, by forming the notch filter type vibration isolator by using the bellows 44 and the elastic member 45, vibrations of a particular frequency (for example, the rotation frequency of the rotor 8) can be reduced (damped) effectively. The bellows 44 and the elastic member 45 are elements also provided on the conventional damper. Although the mass of the bellows 44 is not so great because the bellows 44 is formed by a thin-wall member, the mass thereof is enough to reduce minute vibrations. That is, in this embodiment, vibrations of a particular frequency can be reduced effectively without adding a component.

Also, by providing the above-described mechanism for adjusting the center frequency fc of the notch band, the center frequency fc of the notch band can be adjusted easily. By setting the center frequency fc of the notch band, for example, in the vicinity of the rotation frequency of the rotor 8, vibrations synchronizing with the rotation frequency of the rotor 8 can be reduced (damped) properly.

For the vibration isolator (the damper section D or the damper device 80) in this embodiment, vibrations can be reduced (damped) without decreasing the natural frequency of the whole of the vibration isolator system.

Therefore, since the low frequency rigidity of the vibration isolator need not be decreased, the rigidity against disturbance can be held sufficiently. Further, since the low frequency rigidity of the vibration isolator can be held sufficiently, the degree of freedom (flexibility) of the installation posture of the turbo-molecular pump 1, 70 can be improved.

Even in the case where the frequency band desired to reduce (damp) vibrations differs from device to device, according to this embodiment, measures can be taken flexibly by setting the center frequency fc of the notch band in the vicinity of the frequency band desired to reduce (damp) vibrations. As the frequency band desired to reduce (damp) vibrations differs example, a band of the rotation frequency of the rotor 8 and a band of frequency including a high-order (second-order, third-order, etc.) component of the rotation frequency of the rotor 8.

In the case where it is desired to reduce (damp) vibrations on a plurality of frequency bands at the same time, the vibrations can be reduced (damped) by connecting (joining) vibration isolators each having a different setting region of the center frequency fc of the notch band so as to be lapped at a plurality of stages. In this case as well, proper sealing is performed to secure the gastightness in the connecting portion of the vibration isolators.

The natural frequency of the bellows 44 exists in both of the radial direction and the axial direction, and a high-order natural frequency of second or higher order also exists. Therefore, by setting the direction of natural frequency and the frequency properly, measures can be taken flexibly for the direction of vibrations desired to be reduced (damped) such as the radial direction or the axial direction and the frequency.

In a device in which the vibrations in the radial direction and the vibrations in the axial direction relate closely to each other like a magnetic bearing type turbo-molecular pump, an effect that the reduction in vibration in the radial direction also reduces the vibration in the axial direction, or the reduction in vibration in the axial direction also reduces the vibration in the radial direction can sometimes be achieved.

In this embodiment, the center frequency fc of the notch band is adjusted by changing the extension amount of the bellows 44. However, the method for adjusting the center frequency fc of the notch band is not limited to this method. For example, the center frequency fc of the notch band may be adjusted by changing the plate thickness or the number of peaks of the bellows 44, or by adding a weight to the bellows 44 to change the mass thereof, or a plurality of center frequency fc may be set (for example, fc1, fc2, . . . ).

Besides, the center frequency fc of the notch band may be adjusted, for example, by disposing a member such as a beam and a spring on the inside or the outside of the vibration isolator (the damper section D, the damper device 80) or the turbo-molecular pump 1 (the pump section P) and by utilizing the natural frequency of the member by combining with the own weight thereof or a mass element. In this case as well, a plurality of members may be provided to set a plurality of center frequencies fc.

Further, the center frequency fc of the notch band may be adjusted, for example, by disposing a spring material in a circumferential shape in place of the elastic member 45 and by changing the natural frequency of this spring material.

What is claimed is:

1. A damper configured to restrain the propagation of vibrations produced in a vacuum pump to a vacuum system during evacuation of the vacuum system by the vacuum pump via gas transfer by a gas transfer mechanism in the vacuum pump by means of the rotating action of a rotating body in the vacuum pump, the damper comprising: a first vibration absorbing member having a spring constant and a mass and being configured for arrangement between the vacuum system and the vacuum pump, and a second vibration absorbing member having a spring constant and a viscosity damping coefficient and being configured for arrangement between the vacuum system and the vacuum pump with sufficient clearance from the first vibration absorbing member so as to prevent the first and second vibration absorbing members from coming into contact with one another during an evacuation operation by the vacuum pump, the spring constants, mass and viscosity damping coefficient of the first and second vibration absorbing members being so set such that the first and second vibration absorbing members form a notch filter-type vibration isolator having a damping characteristic in a frequency band that coincides substantially with a rotation frequency of the rotating body of the vacuum pump; wherein the first vibration absorbing member comprises a thin-wall cylindrical member the peripheral surface of which is of a bellows shape, and the second vibration absorbing member comprises an elastic member disposed at an outer periphery of the thin-wall cylindrical member, the elastic member being configured so as to confront and surround only a portion of an outer periphery of the thin-wall cylindrical member.

2. A damper according to claim 1; wherein the frequency band corresponding to the damping characteristic of the notch filter-type vibration isolator has a center frequency that is calculated by the natural frequency of the first vibration absorbing member; and wherein the notch filter-type vibration isolator is configured so that the center frequency of the frequency band coincides substantially with the rotation frequency of the rotating body of the vacuum pump.

3. A vacuum pump provided with the damper according to claim 2.

4. A damper according to claim 1; wherein the frequency band corresponding to the damping characteristic of the notch filter-type vibration isolator has a center frequency configured for adjustment by a change in the natural frequency of the thin-wall cylindrical member.

5. A vacuum pump provided with the damper according to claim 4.

6. A vacuum pump provided with the damper according to claim 1.

7. In combination with a vacuum pump for evacuating a vacuum system via gas transfer by a gas transfer mechanism in the vacuum pump by means of the rotating action of a rotating body in the vacuum pump, a damper for restraining the propagation of vibrations produced in the vacuum pump to the vacuum system during an evacuation operation, the damper comprising: a vibration absorbing device positionable between the vacuum pump and the vacuum system during an evacuation operation and having a damping characteristic in a frequency band that coincides substantially with a rotation frequency of the rotating body of the vacuum pump; wherein the vibration absorbing device comprises a thin-wall cylindrical member the peripheral surface of which is of a bellows shape, and an elastic member disposed at an outer periphery the thin-wall cylindrical member, the elastic member being configured so as to confront and surround only a portion of an outer periphery of the thin-wall cylindrical member.

8. A combination according to claim 7; wherein the vibration absorbing device forms a notch-filter type vibration isolator.

9. A combination according to claim 7; wherein the thin-wall cylindrical member has a spring constant and a mass, and the elastic member has a spring constant and viscosity damping coefficient and is positioned with sufficient clearance from the the thin-wall cylindrical member so as to prevent the thin-wall cylindrical member and the elastic member from coming into contact with one another during an evacuation operation by the vacuum pump, the spring constants, mass and viscosity damping coefficient of the corresponding thin-wall cylindrical member and the elastic member being so set that a center frequency of the frequency band corresponding to the damping characteristic coincides substantially with the rotation frequency of the rotating body of the vacuum pump.

10. A combination according to claim 7; wherein the vacuum pump comprises a suction port and an exhaust port such that during an evacuation operation the gas transfer mechanism transfers gas from the suction port to the exhaust port by the rotating action of the rotating body; wherein the thin-wall cylindrical member is positioned with sufficient clearance from the elastic member so as to prevent the thin-wall cylindrical member and the elastic member from coming into contact with one another during an evacuation operation by the vacuum pump; wherein the frequency band corresponding to the damping characteristic of the vibration absorbing device has a center frequency that is calculated by the natural frequency of the thin-wall cylindrical member; and wherein the vibration absorbing device is configured so that the center frequency of the frequency band coincides substantially with the rotation frequency of the rotating body of the vacuum pump.

* * * * *